US011698637B2

(12) United States Patent
Arima et al.

(10) Patent No.: US 11,698,637 B2
(45) Date of Patent: Jul. 11, 2023

(54) METHOD AND SYSTEM FOR A COMPANION AUTONOMOUS VEHICLE

(71) Applicant: Honda Motor Co., Ltd., Tokyo (JP)

(72) Inventors: Takero Arima, Torrance, CA (US); Christopher Tarchala, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/860,280

(22) Filed: Jul. 8, 2022

(65) Prior Publication Data
US 2022/0342418 A1    Oct. 27, 2022

Related U.S. Application Data

(60) Division of application No. 16/572,755, filed on Sep. 17, 2019, now Pat. No. 11,454,972, which is a continuation-in-part of application No. 16/395,617, filed on Apr. 26, 2019, now Pat. No. 11,403,952.

(51) Int. Cl.
  *G05D 1/00* (2006.01)
  *G08G 1/00* (2006.01)
  *H04W 4/46* (2018.01)
  *G05D 1/02* (2020.01)

(52) U.S. Cl.
  CPC ......... *G05D 1/0088* (2013.01); *G05D 1/0022* (2013.01); *G05D 1/0246* (2013.01); *G05D 1/0285* (2013.01); *G08G 1/22* (2013.01); *H04W 4/46* (2018.02); *G05D 1/0278* (2013.01); *G05D 2201/0213* (2013.01)

(58) Field of Classification Search
CPC .. G05D 1/0088; G05D 1/0022; G05D 1/0246; G05D 1/0285; G05D 1/0278; H04W 4/46; G08G 1/22
See application file for complete search history.

(56) References Cited

U.S. PATENT DOCUMENTS

| 7,818,190 | B1 | 10/2010 | Sutherland |
| 8,199,890 | B2 | 6/2012 | Pirzada |
| 8,948,914 | B2 | 2/2015 | Zini et al. |
| 9,665,101 | B1 | 5/2017 | Templeton |
| 9,733,096 | B2 | 8/2017 | Colijn et al. |
| 10,013,821 | B1 * | 7/2018 | Dudar ................ B64C 39/024 |

(Continued)

FOREIGN PATENT DOCUMENTS

| EP | 3246776 B1 | 11/2020 |
| IN | 20161044061 A | 6/2018 |

(Continued)

*Primary Examiner* — Behrang Badii
*Assistant Examiner* — Jay Khandpur
(74) *Attorney, Agent, or Firm* — Plumsea Law Group, LLC

(57) ABSTRACT

A method and system for providing a companion autonomous vehicle are described. In one embodiment, a method includes linking a companion autonomous vehicle to at least one vehicle, device, or user. The companion autonomous vehicle is tethered to the at least one vehicle, device, or user such that the companion autonomous vehicle is configured to stay within a predetermined range of the at least one vehicle, device, or user. The method further includes operating the companion autonomous vehicle to travel along with the tethered at least one vehicle, device, or user within the predetermined range.

20 Claims, 14 Drawing Sheets

(56) References Cited

U.S. PATENT DOCUMENTS

| | | | |
|---|---|---|---|
| 10,222,798 B1* | 3/2019 | Brady | G06Q 10/0832 |
| 10,625,685 B1 | 4/2020 | Gruener | |
| 2008/0027599 A1 | 1/2008 | Logan et al. | |
| 2010/0180031 A1* | 7/2010 | Cacheria, III | G06Q 20/042 |
| | | | 709/225 |
| 2011/0242533 A1 | 10/2011 | Treado et al. | |
| 2013/0342368 A1 | 12/2013 | Nathanson | |
| 2015/0356665 A1* | 12/2015 | Colson | G06Q 30/0635 |
| | | | 705/26.81 |
| 2016/0033966 A1 | 2/2016 | Farris et al. | |
| 2017/0228025 A1 | 8/2017 | Hall et al. | |
| 2017/0355295 A1 | 12/2017 | Gutowitz | |
| 2019/0018418 A1 | 1/2019 | Tseng et al. | |
| 2019/0105995 A1 | 4/2019 | Prasad et al. | |
| 2019/0197798 A1* | 6/2019 | Abari | G06N 5/04 |
| 2019/0250616 A1* | 8/2019 | Ramanujam | G07C 5/085 |
| 2019/0391587 A1* | 12/2019 | Uvarov | G05D 1/0088 |
| 2021/0366475 A1* | 11/2021 | Wilkosz | G10L 15/22 |

FOREIGN PATENT DOCUMENTS

| | | |
|---|---|---|
| KR | 101074328 B1 | 10/2011 |
| KR | 101583061 B1 | 1/2016 |
| KR | 20160029761 A | 3/2016 |
| KR | 101933493 B1 | 12/2018 |
| KR | 101918744 B1 | 2/2019 |
| WO | 2019240664 A1 | 12/2019 |

* cited by examiner

METHOD AND SYSTEM FOR A COMPANION AUTONOMOUS VEHICLE

CROSS-REFERENCE TO RELATED DISCLOSURES

This application is a division of U.S. application Ser. No. 16/572,755 filed on Sep. 17, 2019 and titled "Method and System for Providing An Equipped Autonomous Vehicle to a Destination", which application is a continuation-in-part of U.S. application Ser. No. 16/395,617 filed on Apr. 26, 2019 and titled "Method and System for Providing An Equipped Autonomous Vehicle to a Destination," the disclosures of which applications are incorporated in their entirety into this disclosure by reference.

BACKGROUND

The embodiments relate generally to autonomous vehicles, and in particular to a method and system for providing a companion autonomous vehicle.

Many types of outdoor activities can include specialized equipment. This equipment can be used a few times a year and is usually kept in storage. Participants of outdoor activities can plan for storing, maintaining, and transporting this specialized equipment to a desired destination where it is to be used. Participants who enjoy a variety of outdoor activities can store, maintain, and/or transport large quantities of different specialized equipment for each outdoor activity. Additionally, participants can take care of returning and cleaning the equipment from a destination after a trip has ended.

SUMMARY

The techniques of the present embodiments described herein provide a method and system for providing a companion autonomous vehicle.

In one aspect, a method for providing a companion autonomous vehicle is provided. The method includes linking a companion autonomous vehicle to at least one vehicle, device, or user. The companion autonomous vehicle is tethered to the at least one vehicle, device, or user such that the companion autonomous vehicle is configured to stay within a predetermined range of the at least one vehicle, device, or user. The method further includes operating the companion autonomous vehicle to travel along with the tethered at least one vehicle, device, or user within the predetermined range.

In another aspect, a method for providing services by a companion autonomous vehicle at a location is provided. The method includes providing at least one companion autonomous vehicle to travel to a location. The method also includes equipping the at least one companion autonomous vehicle with a cellular communication component to allow the at least one companion autonomous vehicle to communicate using a cellular communication network. The method further includes providing at least one of a point-of-sale interface or an emergency services interface on the at least one companion autonomous vehicle that uses the cellular communication component to communicate over the cellular communication network.

In another aspect, a companion autonomous vehicle is provided. The companion autonomous vehicle includes an autonomous driving system including steering and propulsion capabilities, a communication interface including at least one component for providing wireless communication, and a suite of sensors including one or more of a camera, a LIDAR sensor, or a global positioning system (GPS) sensor. The companion autonomous vehicle further includes a processor in communication with at least the autonomous driving system, the communication interface, and the suite of sensors. The processor is configured to link the companion autonomous vehicle to at least one vehicle, device, or user via the communication interface. The companion autonomous vehicle is tethered to the at least one vehicle, device, or user such that the companion autonomous vehicle is configured to stay within a predetermined range of the at least one vehicle, device, or user. The processor is further configured to operate the companion autonomous vehicle using the autonomous driving system and the suite of sensors to travel along with the tethered at least one vehicle, device, or user within the predetermined range.

Other systems, methods, features and advantages of the exemplary embodiments will be, or will become, apparent to one of ordinary skill in the art upon examination of the following figures and detailed description. It is intended that all such additional systems, methods, features and advantages be included within this description and this summary, be within the scope and protected by the claims.

BRIEF DESCRIPTION OF THE DRAWINGS

The exemplary embodiments can be better understood with reference to the following drawings and description. The components in the figures are not necessarily to scale. Moreover, in the figures, like reference numerals designate corresponding parts throughout the different views.

DETAILED DESCRIPTION

The example embodiments described herein provide a method and system for providing an equipped autonomous vehicle to a destination based on a request from a user. The techniques described herein allow users to enjoy a variety of outdoor activities without needing to worry about purchasing, storing, maintaining, and/or transporting specialized equipment for the outdoor activities to the user's desired destination where the equipment is to be used. A user merely needs to travel to the destination where the equipped autonomous vehicle will meet the user with the appropriate equipment for the selected outdoor activities. Once the user is finished, the equipment is placed back into the equipped autonomous vehicle, which returns to a service center to be readied for the next user.

The example embodiments described herein further provide a method and system for a companion autonomous vehicle. The companion autonomous vehicle can be virtually tethered to another vehicle, a device, or a user to follow or scout ahead of the vehicle, device, or user. The companion autonomous vehicle can provide additional or supplemental functionality or services to a vehicle, device, or user, as described herein.

Figure 1:
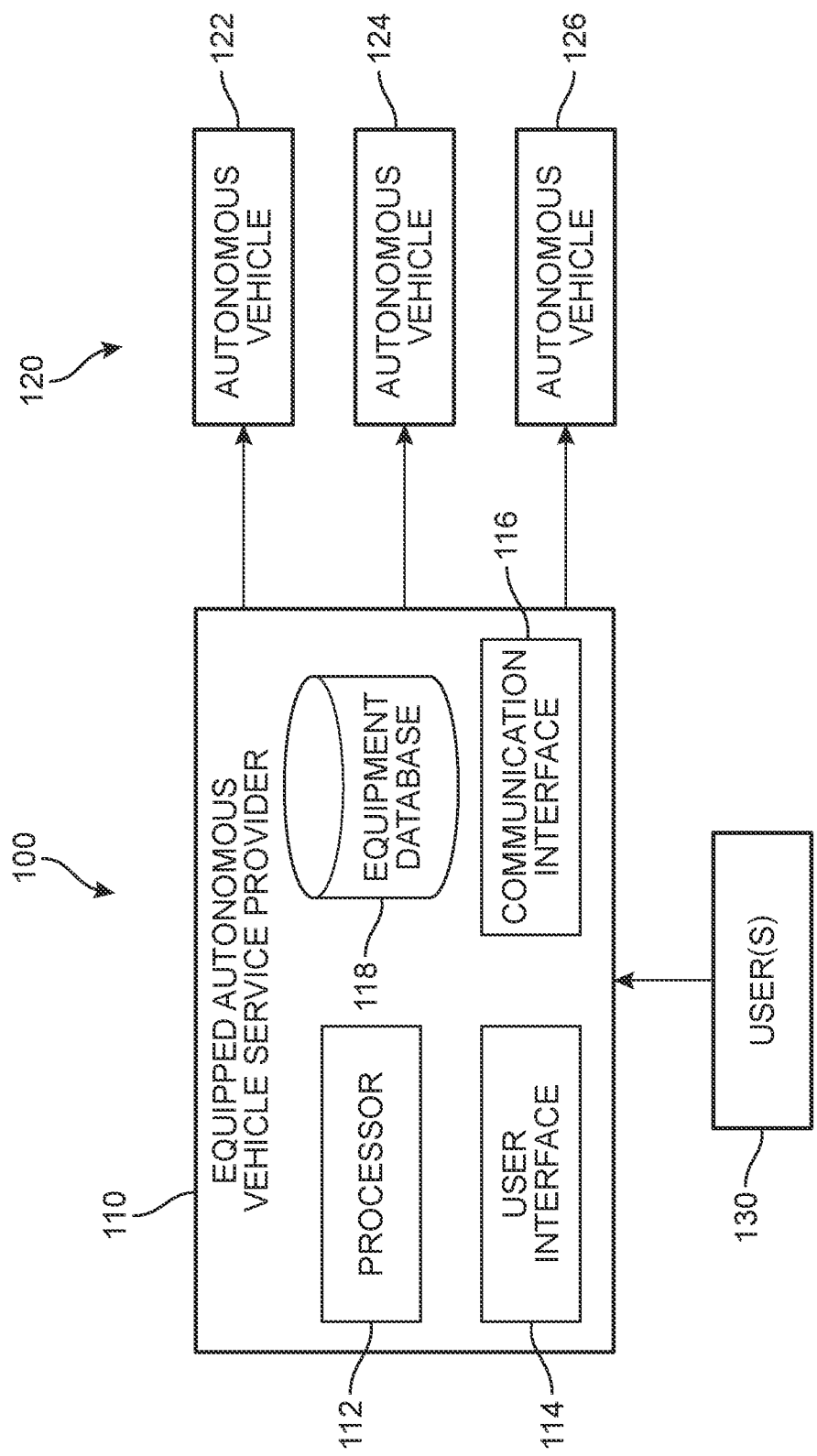
FIG. 1 is a schematic view of an example embodiment of a system for providing an equipped autonomous vehicle.

FIG. 1 illustrates a schematic diagram of an embodiment of a system 100 for providing an equipped autonomous vehicle. In an example embodiment, system 100 can include an equipped autonomous vehicle service provider 110 and a plurality of autonomous vehicles 120. Equipped autonomous vehicle service provider 110 can include hardware, software, and components that are configured to communicate with a plurality of autonomous vehicles 120 and one or more users 130 requesting equipped autonomous vehicles.

In this embodiment, equipped autonomous vehicle service provider 110 can include a processor 112 that is in communication with at least a user interface 114, a communication interface 116, and an equipment database 118. In some embodiments, equipped autonomous vehicle service provider 110 can include other components not shown in FIG. 1 to facilitate receiving requests from users, determining equipment for selected activities, and instructing plurality of autonomous vehicles 120 to travel to particular destinations according to the example embodiments described herein.

In some embodiments, user interface 114 is configured to allow one or more users 130 to contact and communicate with equipped autonomous vehicle service provider 110. For example, in one embodiment, user interface 114 can interact with users 130 through an application (e.g., mobile app) or website. Communication interface 116 is configured to allow equipped autonomous vehicle service provider 110 to communicate with one or more autonomous vehicles of plurality of autonomous vehicles 120. For example, in one embodiment, communication interface 116 can be a wireless transceiver that transmits signals (e.g., commands, messages, information, etc.) to one or more autonomous vehicles of plurality of autonomous vehicles 120 and also receives signals from one or more autonomous vehicles of plurality of autonomous vehicles 120.

In this embodiment, plurality of autonomous vehicles 120 can include a first autonomous vehicle 122, a second autonomous vehicle 124, and a third autonomous vehicle 126. FIG. 1 illustrates three autonomous vehicles for the purpose of explanation, however, it should be understood that equipped autonomous vehicle service provider 110 can be configured to communicate with any number of autonomous vehicles. For example, in some embodiments, equipped autonomous vehicle service provider 110 can be configured to communicate with a fleet of autonomous vehicles, which can be located in different geographic locations. In this manner, equipped autonomous vehicle service provider 110 can be able to provide equipped autonomous vehicles to users (e.g., users 130) for destinations that are located across a large portion of a geographic area.

In some embodiments, equipment database 118 can include various sets of equipment that are associated with different activities. In an example embodiment, each activity can be matched or correlated with a specific set of equipment for that activity. Equipped autonomous vehicle service provider 110 can provide a list of each piece of equipment within a set of equipment to a user based on the user's selection of an activity to be performed or conducted at the user's destination. For example, based on a user's selected activity, a default set of equipment can be provided to the user that is specific to that activity and the user can choose from the various pieces of equipment in the set of equipment. In some embodiments, the user can also request particular items or pieces of equipment for an activity that can not be included in the set of equipment associated with that activity in equipment database 118.

In an example embodiment, the user's selected activity is an outdoor activity and the associated sets of equipment are related to the outdoor activity. For example, an outdoor activity can include one or more of camping, hiking, fishing, climbing, kayaking, snorkeling, skiing, hunting, tailgating, picnicking, or cycling. In other embodiments, other activities can also be selected by a user. For example, other activities can include parties, moving, holiday events, etc.

In some embodiments, equipment database 118 can include other information, including, but not limited to: information associated with a user (e.g., name, address, billing information, preferences, equipment or clothing sizes, other personal information, etc.), information associated with one or more autonomous vehicles of plurality of autonomous vehicles 120 (e.g., vehicle ID, capacity, location, status or availability, capabilities, etc.), routing or navigation information (e.g., for instructing equipped autonomous vehicles to travel to particular destinations, waypoints, or service centers, etc.), and/or other information that can be used by equipped autonomous vehicle service provider 110.

Figure 2:
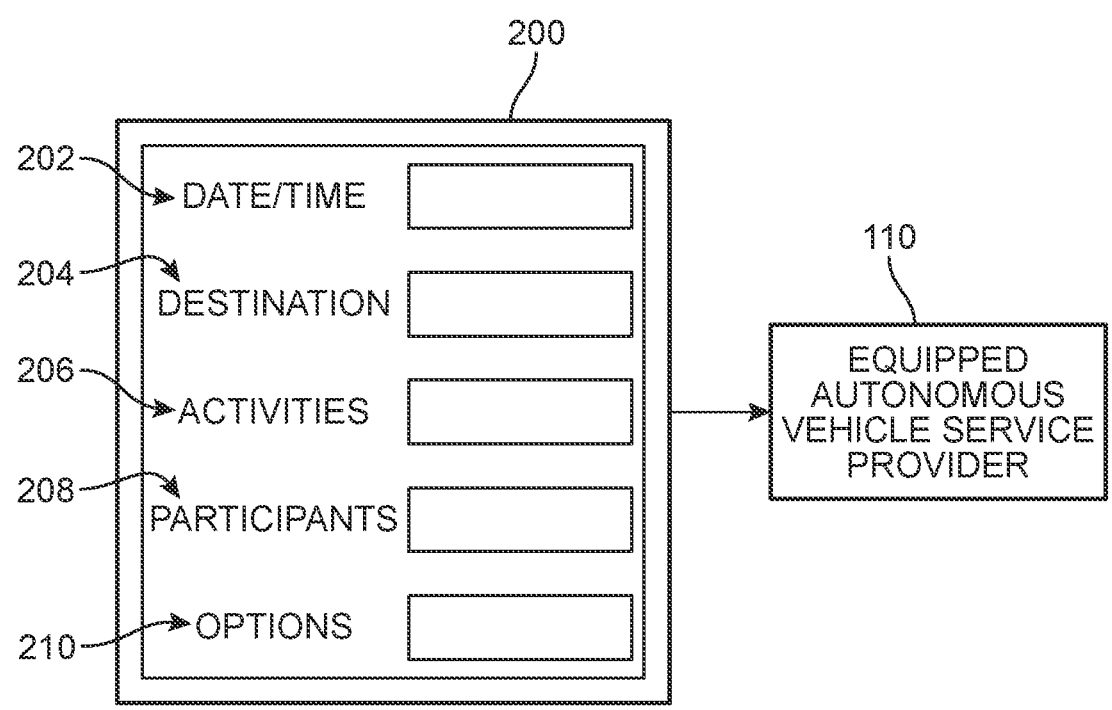
FIG. 2 is a schematic view of an example embodiment of a user interface for requesting an equipped autonomous vehicle.

Referring now to FIG. 2, an example embodiment of a user interface 200 for requesting an equipped autonomous vehicle is shown. As described above, in some embodiments, a user (e.g., one or more of users 130) can interact with user interface 114 at equipped autonomous vehicle service provider 110, which can be a mobile app or website. In an example embodiment, user interface 200 is provided on the user-side to allow the user to provide information to user interface 114 of equipped autonomous vehicle service provider 110. For example, user interface 200 can be provided through a user's mobile telephone, tablet, computer, or other device to allow the user to enter relevant information associated with a request for an equipped autonomous vehicle to a destination from equipped autonomous vehicle service provider 110.

In this embodiment, user interface 200 can include a number of fields to request information from the user about the request for the equipped autonomous vehicle. For example, as shown in FIG. 2, user interface 200 can include a data/time field 202 for information associated with the date(s) and time(s) that the user would like to request the equipped autonomous vehicle. User interface 200 can include a destination field 204 for information associated with a destination for the request and an activities field 206 for information associated with one or more activities for which the user would like to have equipment provided with the autonomous vehicle. Additionally, user interface 200 can include other fields, including, for example, a participants field 208 for information about a number of participants for the activities (e.g., the activities selected in activities field 206) and an options field 210 for other information that the user provides to equipped autonomous vehicle service provider 110 about the request, for example, additional equipment, clothing or equipment sizes, user preferences, etc.

Each field in user interface 200 can include a corresponding data entry area so that the user can enter the requested information. In some embodiments, the data entry area can be in the form of a drop down menu populated with predefined selections or can be a calendar, for example, in the case of date/time field 202, or other optional selection mechanism. Once the user has provided the information requested in fields 202, 204, 206, 208, and/or 210 via user interface 200, the request can be provided to equipped autonomous vehicle service provider 110. For example, as described above, equipped autonomous vehicle service provider 110 can receive the request sent by the user from user interface 200 via user interface 114.

Figure 3:
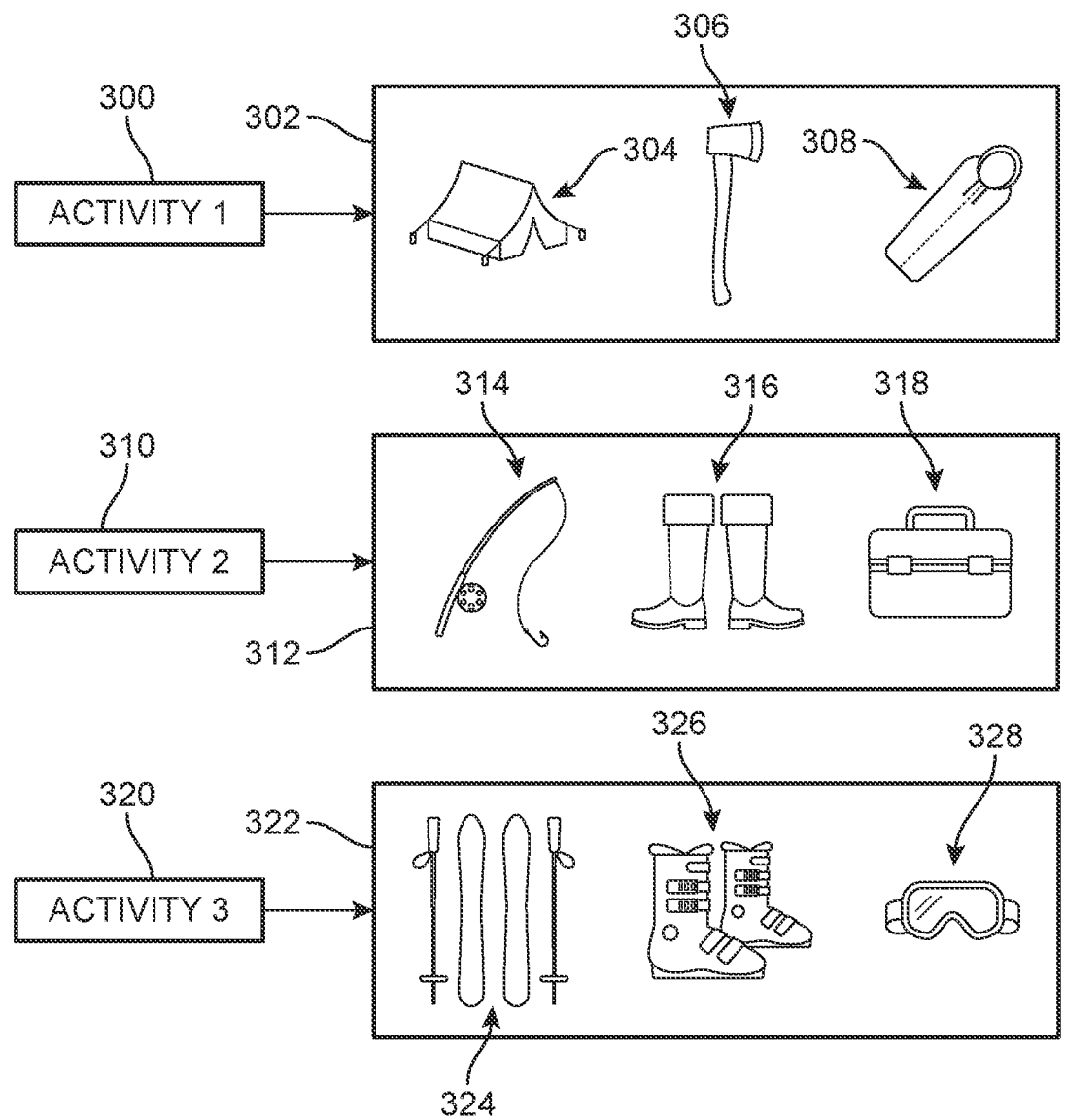
FIG. 3 is a representative view of example embodiments of sets of equipment associated with different activities.

Based on the request from the user, equipped autonomous vehicle service provider 110 determines at least one set of equipment for the activity or activities selected by the user in the request. Referring now to FIG. 3, example embodiments of sets of equipment associated with different activities are illustrated. In some embodiments, each activity can be associated with a default or predetermined set of equipment that is specific to that activity. Users can select particular equipment from the set of equipment and can modify, change, replace, remove, or add equipment based on the user's own preferences or needs.

For example, as shown in FIG. 3, a first activity 300 can be associated with a first set of equipment 302. In this embodiment, first activity 300 is camping and first set of equipment 302 can include a tent 304, an axe 306, and a sleeping bag 308. A second activity 310 can be associated with a second set of equipment 312 that is different than first set of equipment 302 and is specific to second activity 310. In this embodiment, second activity 310 is fishing and second set of equipment 312 can include a fishing pole 314, a pair of waders 316, and a tackle box 318. Similarly, a third activity 320 can be associated with a third set of equipment 322 that is different than first set of equipment 302 and second set of equipment 312 and is specific to third activity 320. In this embodiment, third activity 320 is snow skiing and third set of equipment 322 can include a pair of skis and poles 324, a pair of ski boots 326, and ski goggles 328.

In an example embodiment, each set of equipment 302, 312, 322 associated with each activity 300, 310, 320 can be stored in equipment database 118 at equipped autonomous vehicle service provider 110, as described above. It should be understood that the activities and associated sets of equipment shown in FIG. 3 are merely exemplary and additional or different activities and/or equipment can be provided to a user for a selected activity.

Additionally, a user can request sets of equipment for multiple activities and/or multiple participants. For example, in cases where a user's request indicates that multiple participants will be participating in first activity 300 (e.g., camping), equipped autonomous vehicle service provider 110 can include multiple pieces of equipment in the sets of equipment to reflect the number of participants, such as multiple sleeping bags 308 and/or a larger tent size for tent 304. Similarly, other modifications to the number and/or types of pieces of equipment for each set of equipment associated with a particular activity can be made based on the number of participants or other provided information accompanying the user's request to equipped autonomous vehicle service provider 110.

Figure 4:
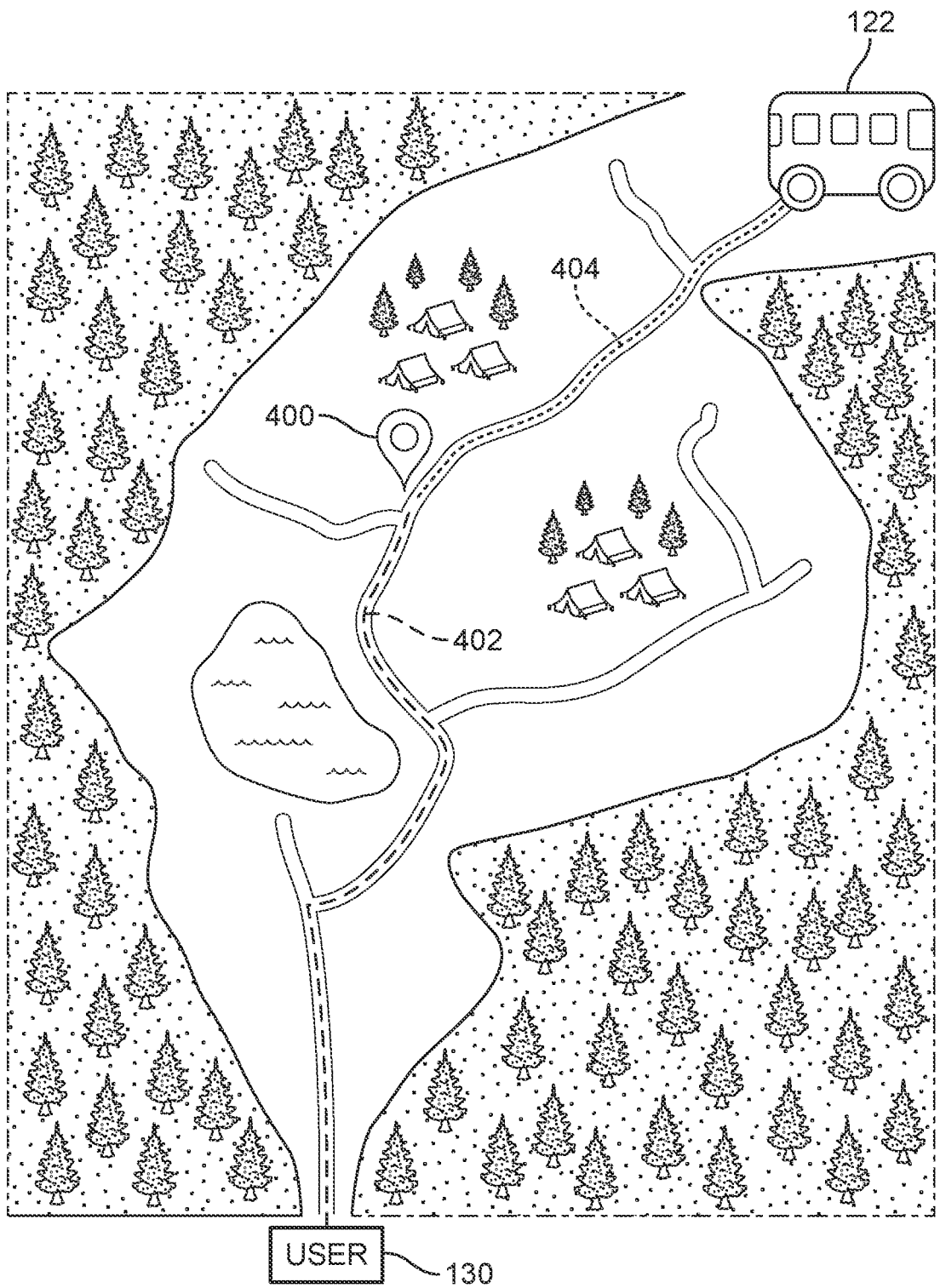
FIG. 4 is a representative view of an example embodiment of a method for providing an equipped autonomous vehicle to a destination.

Referring now to FIG. 4, an example embodiment of a method for providing an equipped autonomous vehicle to a destination is illustrated. As described above, in some embodiments, a user can request an equipped autonomous vehicle from a service provider (e.g., equipped autonomous vehicle service provider 110) that can include equipment for one or more activities at a destination selected by the user. In the embodiment shown in FIG. 4, user 130 has requested an equipped autonomous vehicle to meet user 130 at a destination 400. In response to the request from user 130, equipped autonomous vehicle service provider 110 has instructed first autonomous vehicle 122 to travel to destination 400.

In this embodiment, destination 400 is a campground. Accordingly, user 130 can include with the request information about one or more activities to be performed at destination 400. For example, user 130 can have indicated camping as a selected activity for destination 400. According to the techniques of the present embodiments described herein, first autonomous vehicle 122 is equipped with at least one set of equipment that is specific to the selected activity (e.g., camping). With this arrangement, user 130 can take a first route 402 to travel to destination 400, while first autonomous vehicle 122 takes a second route 404 to travel to destination 400.

As can be seen in FIG. 4, first route 402 to destination 400 taken by user 130 is different than second route 404 to destination 400 taken by first autonomous vehicle 122. Thus, user 130 does not need to rent and/or pull a trailer or camper to destination 400 to be able to enjoy the one or more activities to be performed at destination 400. Instead, user 130 can travel to destination 400 along any route and using any vehicle.

Figure 5:
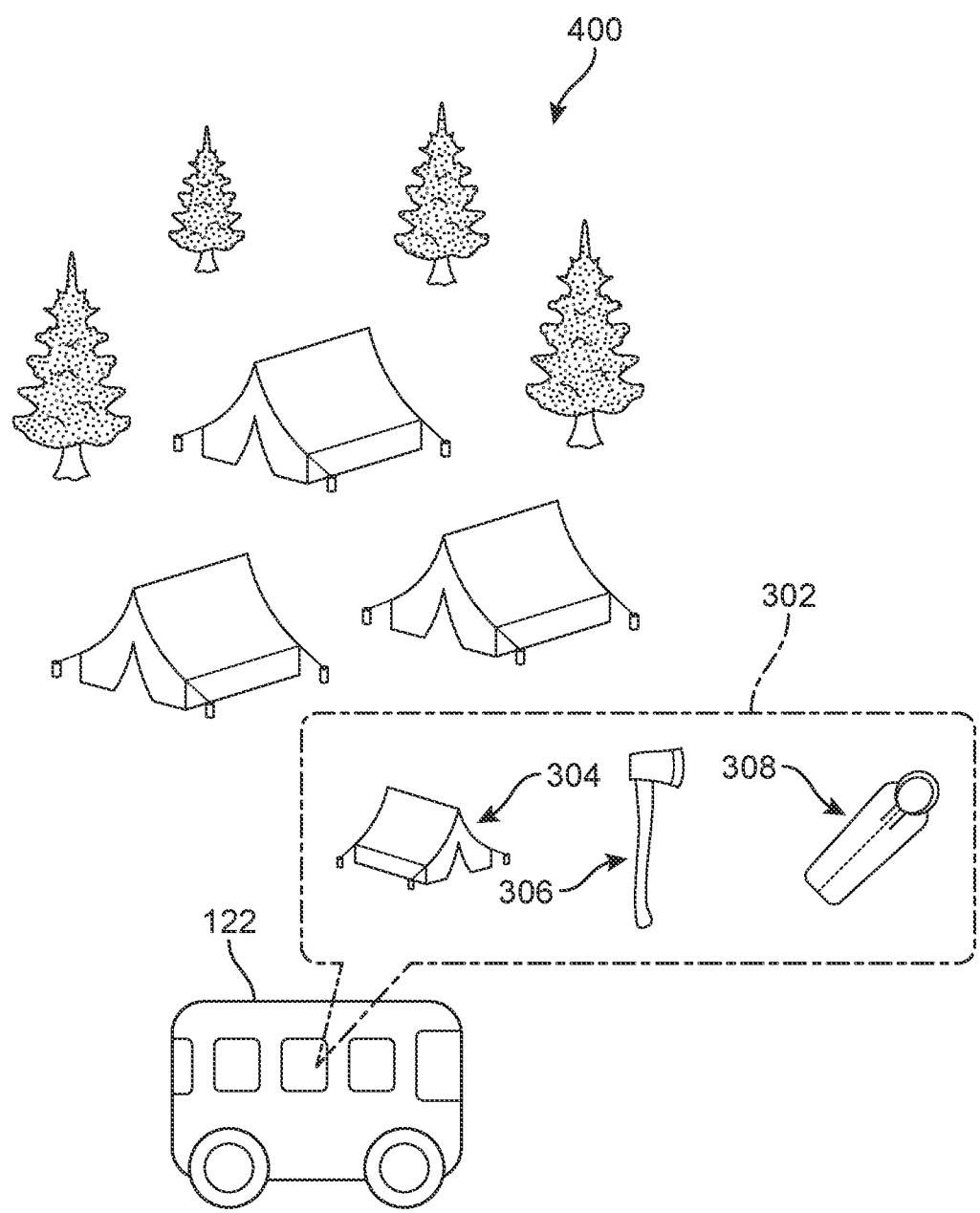
FIG. 5 is a schematic view of an example embodiment of an equipped autonomous vehicle with a set of equipment at a destination.

When user 130 arrives at destination 400, first autonomous vehicle 122, which is equipped with at least one set of equipment that is specific to the user-selected one or more activities to be performed at destination 400, is waiting and ready for user 130. Thus, user 130 does not need to bring equipment to destination 400 because it will be provided with equipped first autonomous vehicle 122. For example, as shown in FIG. 5, first autonomous vehicle 122 is equipped with first set of equipment 302 associated with first activity 300 (e.g., camping). When user 130 arrives at destination 400, user 130 can unpack first set of equipment 302 from first autonomous vehicle 122 to use for the selected activity. In this embodiment, user 130 has selected camping as an activity and first set of equipment 302 included with first autonomous vehicle 122 can include at least tent 304, axe 306, and sleeping bag 308.

It should be understood that the equipment included in first set of equipment 302 is merely exemplary. A user can select any number of pieces of equipment to be included with the equipped autonomous vehicle that is instructed to meet the user at the user's selected destination. Additionally, a user can select more than one activity with the request so that multiple sets of equipment are provided with the equipped autonomous vehicle. For example, in FIG. 5, first autonomous vehicle 122 is equipped with first set of equipment 302 associated with first activity 300 (e.g., camping).

In some embodiments, user 130 can select other activities, such as second activity 310 (e.g., fishing), in which case first autonomous vehicle 122 is also equipped with second set of equipment 312 (including fishing pole 314, pair of waders 316, and tackle box 318) to use at destination 400.

In some embodiments, the equipped autonomous vehicle (e.g., first autonomous vehicle 122) can be provided with a security or authentication mechanism to unlock the equipped autonomous vehicle. For example, user 130 can use user interface 200, described above, to confirm the user's identity and/or location at destination 400 in order to unlock equipped first autonomous vehicle 122. The security mechanism can be any type of authentication mechanism, for example, a password, temporary code, two-factor authentication, token, NFC, biometric authentication, or other security feature so that the user and/or equipped autonomous vehicle service provider 110 can be sure that the equipment included in the equipped autonomous vehicle has not been tampered with and/or no unauthorized people have access to the equipped autonomous vehicle.

In addition, in some embodiments, the equipped autonomous vehicle can be configured for use by the user at the destination. For example, the equipped autonomous vehicle can be in the form of a camper, recreational vehicle (RV), or other vehicle capable of providing shelter or living/sleeping areas for a user.

Figure 6:
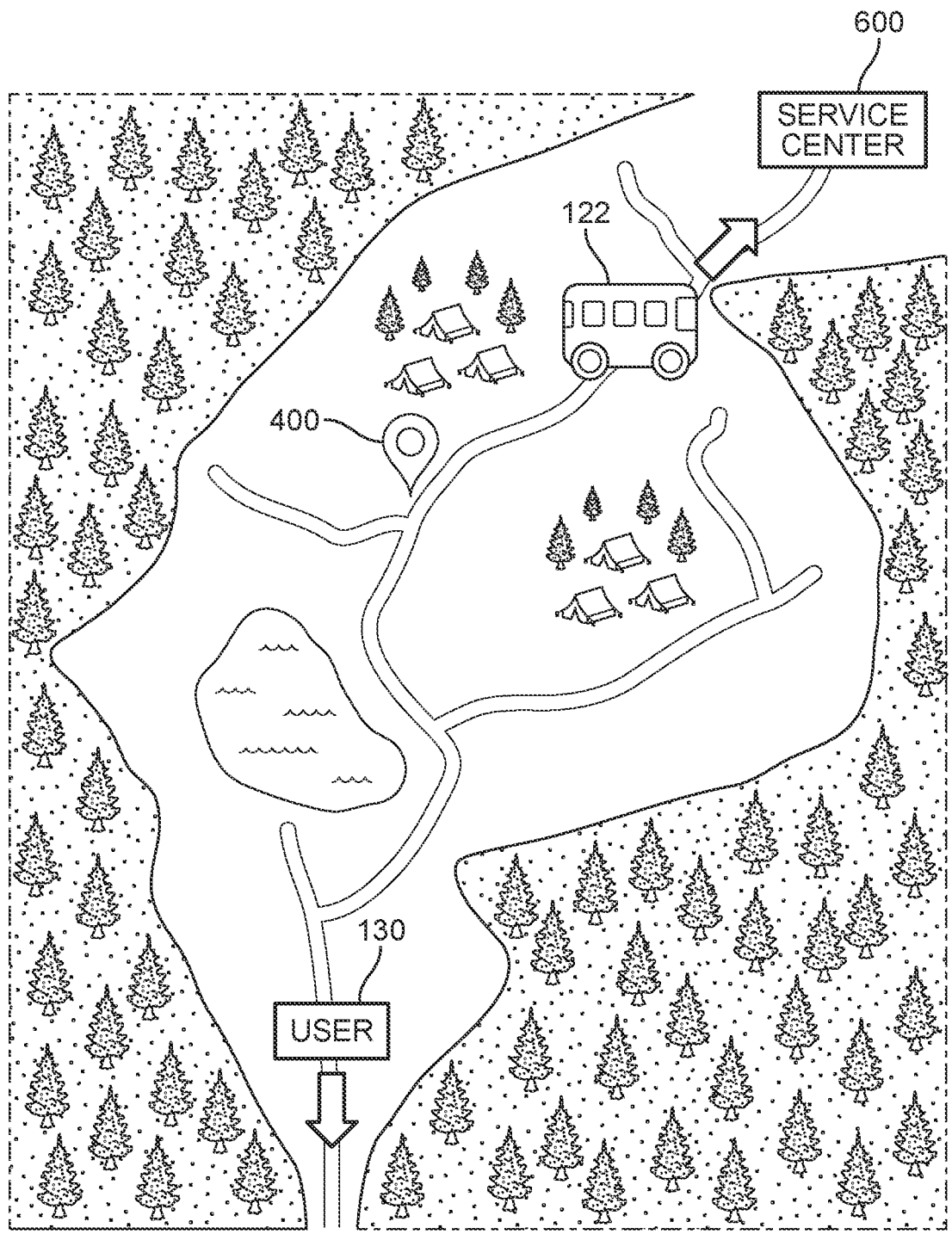
FIG. 6 is a representative view of an example embodiment of a method of returning an equipped autonomous vehicle from a destination.

In some embodiments, when a user is finished using the equipment provided with the equipped autonomous vehicle, the user only needs to place the equipment back into the equipped autonomous vehicle, which will then return to a designated service center or other destination for cleaning and re-equipping for other users. Referring now to FIG. 6, an example embodiment of a method of returning an equipped autonomous vehicle from a destination is shown.

In this embodiment, after user 130 has finished using first set of equipment 302 included with first autonomous vehicle 122, user 130 only needs to return each piece of equipment from first set of equipment 302 back into first autonomous vehicle 122. In some embodiments, user 130 can send a notification or confirmation to equipped autonomous vehicle service provider 110 that user 130 has finished, for example, through user interface 200. Upon receiving the notification from user 130, equipped autonomous vehicle service provider 110 can instruct first autonomous vehicle 122 to travel to a service center 600 from destination 400. In some embodiments, service center 600 is configured to remove the set of equipment (e.g., first set of equipment 302) from the equipped autonomous vehicle (e.g., first autonomous vehicle 122).

Once the equipment is removed, service center 600 can clean first autonomous vehicle 122 and/or the equipment, including performing any needed maintenance or repairs, and can store first set of equipment 302 for subsequent use. In some embodiments, service center 600 can also be configured to re-equip the autonomous vehicle (e.g., first autonomous vehicle 122) based on a request received from a new user.

In some embodiments, an equipped autonomous vehicle can be configured to stop at one or more intermediate destinations prior to reaching the destination selected by the user. For example, an autonomous vehicle can be equipped at the one or more intermediate destinations and/or various pieces of equipment can be located or stored at different locations.

Figure 7:
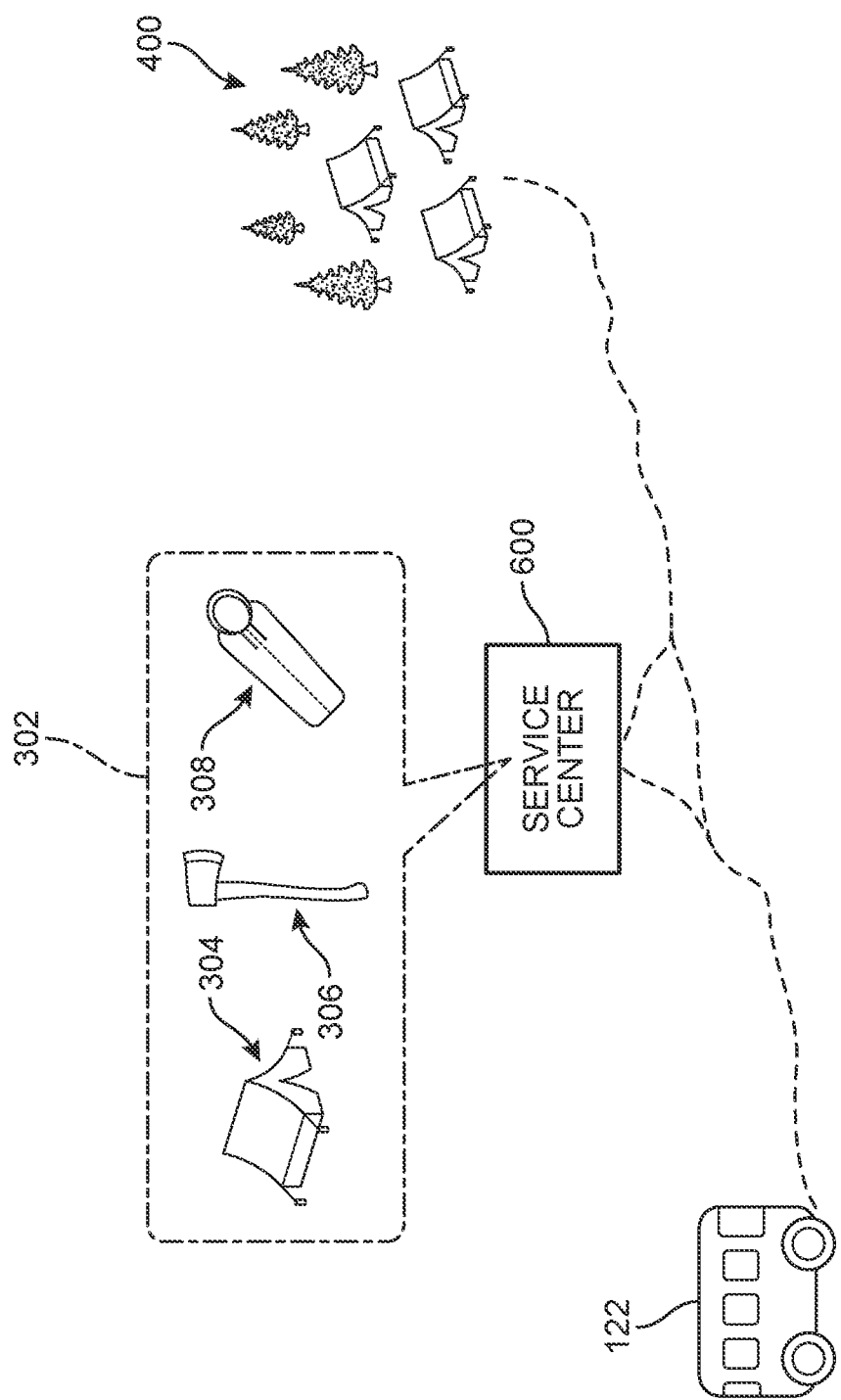
FIG. 7 is a representative view of an alternate embodiment of a method of providing an equipped autonomous vehicle to a destination.

Referring now to FIG. 7, an alternate embodiment of a method of providing an equipped autonomous vehicle to a destination is shown. In this embodiment, first autonomous vehicle 122 has been instructed to travel to destination 400 to provide first set of equipment 302 to user 130, as described above. In this example, first autonomous vehicle 122 first travels to an intermediate destination, service center 600, to obtain first set of equipment 302 before continuing to destination 400. With this arrangement, a plurality of service centers that store various different pieces of equipment can be geographically spread out across an area so that one or more autonomous vehicles of plurality of autonomous vehicles 120 can use the service centers to obtain the equipment associated with a request by a user. By instructing the autonomous vehicle to travel to the one or more intermediate destinations before arriving at the user's requested destination, the autonomous vehicle can be equipped with the specific set or sets of equipment for the activities selected by a user.

In some embodiments, additional suppliers or vendors can provide different types or kinds of equipment or supplies to the equipped autonomous vehicle. For example, first autonomous vehicle 122 can travel to at least one secondary service center or supplier to retrieve perishables, such as food, bait, water, or other consumer goods, that can be requested by the user for use at destination 400. In other embodiments, perishables can be provided at service center 600 or other location where the equipped autonomous vehicle retrieves the selected equipment.

Additionally, in other embodiments, the techniques of the present embodiments can be used to instruct an autonomous vehicle to pick up or obtain other items along its route to a destination. For example, an autonomous vehicle can be instructed to obtain items from a central warehouse or multiple warehouses. In addition, the equipped autonomous vehicle of the example embodiments can also be used to deliver and/or retrieve other items. For example, the techniques described herein can be used to autonomously deliver and/or retrieve seasonal items (e.g., holiday decorations), building supplies and tools, or other hauling tasks.

Figure 8:
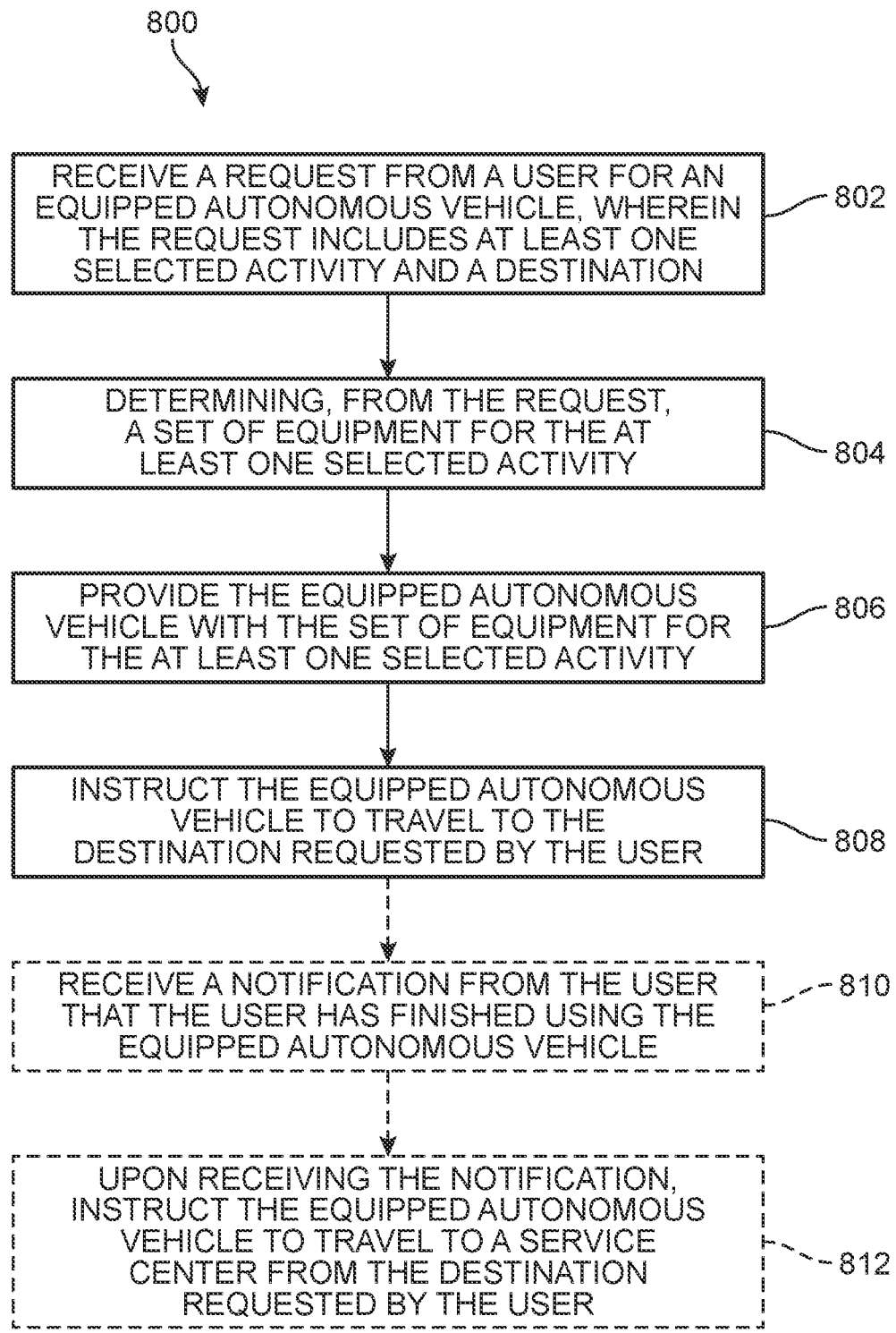
FIG. 8 is a flowchart of an example embodiment of a method for providing an equipped autonomous vehicle to a destination.

Referring now to FIG. 8, a flowchart of an example embodiment of a method 800 for providing an equipped autonomous vehicle to a destination is shown. In an example embodiment, method 800 can be implemented by equipped autonomous vehicle service provider 110, described above. As shown in FIG. 8, method 800 can being at an operation 802 where a request is received from a user for an equipped autonomous vehicle. The request can include at least one selected activity and a destination. For example, as shown in FIG. 4, user 130 has sent a request to equipped autonomous vehicle service provider 110 to have an equipped autonomous vehicle meet user 130 at a destination 400 and has chosen camping as at least one selected activity. It should be understood that the request can include additional information and/or criteria, for example, as described above in reference to user interface 200 shown in FIG. 2.

Next, method 800 can include an operation 804. At operation 804, based on the request in operation 802, a set of equipment for the at least one selected activity is determined. For example, as described in reference to the embodiment of FIG. 4, user 130 indicated camping as a selected activity for destination 400. At operation 804, therefore, first set of equipment 302 that is specific to the selected first activity 300 (e.g., camping) is determined. As described above, in an example embodiment, first set of equipment 302 associated with camping can include at least tent 304, axe 306, and sleeping bag 308.

Method 800 further can include an operation 806, where the equipped autonomous vehicle is provided with the set of equipment for the at least one selected activity. For example, in response to the request from user 130, first autonomous vehicle 122 is equipped with at least one set of equipment that is specific to the selected activity (e.g., camping).

Next, method 800 can include an operation 808. At operation 808, the equipped autonomous vehicle is instructed to travel to the destination requested by the user. For example, as shown in FIG. 4, equipped autonomous vehicle service provider 110 has instructed first autonomous vehicle 122 to travel to destination 400 to meet user 130. In some embodiments, the instruction from equipped autonomous vehicle service provider 110 to first autonomous vehicle 122 can include routing or navigation information for a particular route to destination 400. In other embodiments, first autonomous vehicle 122 can have self-contained routing or navigation capabilities or can communicate with a third party or other entity to receive routing or navigation information to arrive at destination 400.

Method 800 can end upon sending or providing the instruction to the equipped autonomous vehicle to travel to the destination. In other embodiments, method 800 can be implemented again for a new or additional request from the same or different users. In addition, in some embodiments, method 800 can include one or more additional or optional operations. For example, in some cases, method 800 can include an operation 810 where a notification is received from the user that the user has finished using the equipped autonomous vehicle. For example, as described above in reference to FIG. 6, once user 130 has finished using equipped first autonomous vehicle 122, user 130 can send a notification to equipped autonomous vehicle service provider 110 to inform equipped autonomous vehicle service provider 110 that user 130 has finished. In some embodiments, user 130 can send the notification via user interface 200, described above.

Method 800 can also include an operation 812. At operation 812, in response to receiving the notification from the user at operation 810, the equipped autonomous vehicle service provider can instruct the equipped autonomous vehicle to travel to a service center from the destination requested by the user. For example, as shown in FIG. 6, equipped autonomous vehicle service provider 110 can instruct first autonomous vehicle 122 to travel to service center 600 from destination 400 upon receiving a notification from user 130 that user 130 has finished using first autonomous vehicle 122.

In addition, in some cases, instructing the equipped autonomous vehicle to travel to the destination requested by the user (e.g., operation 808) can further include instructing the autonomous vehicle to travel to at least one intermediate destination prior to traveling to the destination. For example, as described in reference to FIG. 7 above.

In some embodiments, a service provider (e.g., equipped autonomous vehicle service provider 110) can be a third party contractor or other entity that cooperates with an owner/operator of a fleet of autonomous vehicles (e.g., plurality of autonomous vehicles 120). Additionally, one or more service centers (e.g., service center 600) that are configured to store, clean, maintain, and provide the pieces of equipment to equip the autonomous vehicles based on the user's request can be provided the same entity as the service provider or can be a third party contractor or other entity that cooperates with the service provider (e.g., equipped autonomous vehicle service provider 110). For example, one or more of the service centers can be outdoor equipment vendors or rental companies that are contracted to provide certain equipment.

The concepts of the present disclosure can be applied to other types of activities and destinations. For example the activities can be tasks, jobs or projects and the destinations can be job sites, with the equipment being tools and supplies for completion of the task, job or project.

In some embodiments, an autonomous vehicle, such as one or more of plurality of autonomous vehicles 120, can be provided as a companion autonomous vehicle to another vehicle, device, or user. That is, the companion autonomous vehicle can be virtually tethered to the vehicle, device, or user so that the companion autonomous vehicle stays within a predetermined range of the vehicle, device, or user, including following behind, traveling/scouting ahead, or otherwise nearby. With this configuration, the companion autonomous vehicle can be configured to provide additional or supplemental functionality or services to a vehicle, device, or user. In some embodiments, the companion autonomous vehicle can be equipped with equipment, as described in the example embodiments above. In other embodiments, the companion autonomous vehicle can be provided with other items, services, or functionality, as will be described below with reference to FIGS. 9-14. It should also be understood that in various embodiments, an autonomous vehicle according to the techniques described herein can include one or more features of the present embodiments alone or in combination with other described features.

Figure 9:
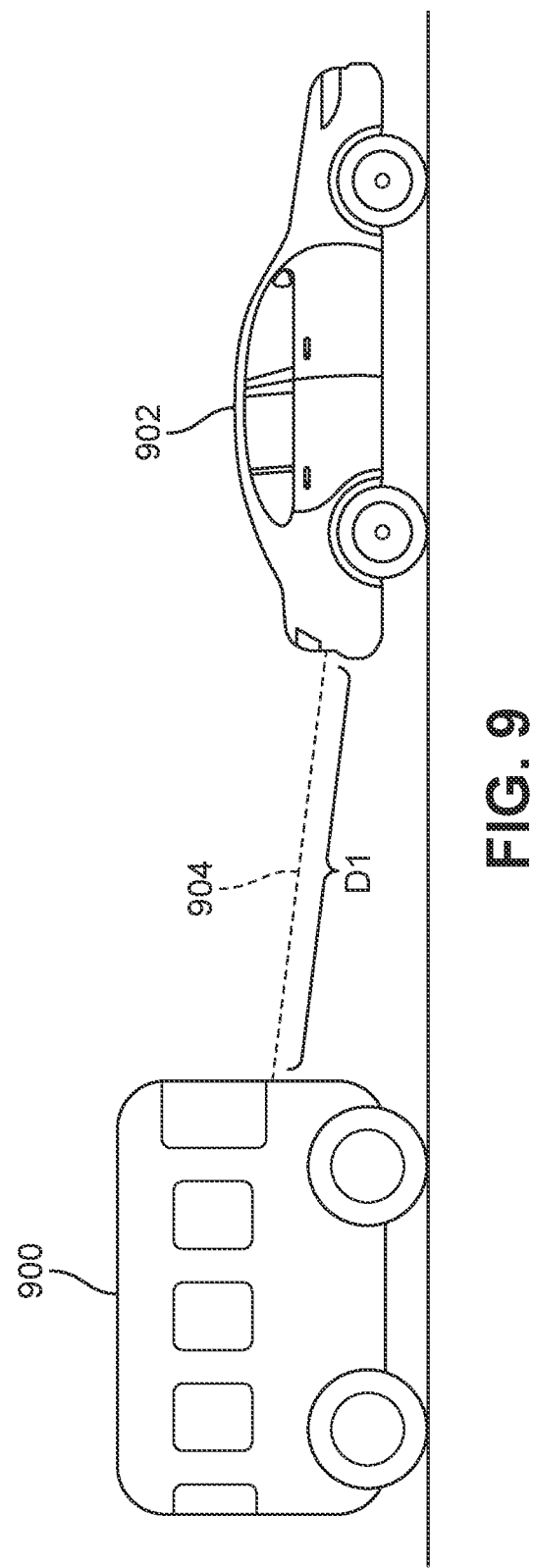
FIG. 9 is a representative view of an example embodiment of a companion autonomous vehicle tethered to a vehicle.

Referring now to FIG. 9, a representative view of an example embodiment of a companion autonomous vehicle 900 is shown tethered to a vehicle 902. In some embodiments, companion autonomous vehicle 900 can be configured to stay within a predetermined range of vehicle 902. In this manner, companion autonomous vehicle 900 and vehicle 902 are virtually tethered to each other. For example, as shown in FIG. 9, companion autonomous vehicle 900 and vehicle 902 are associated with a virtual tether 904 such that companion autonomous vehicle 900 is configured to follow the movements of vehicle 902 at a predetermined distance D1 behind vehicle 902.

In some embodiments, companion autonomous vehicle 900 can be configured to receive vehicle telemetry information from one or more systems in vehicle 902, such as from a telematics control unit (TCU) or Engine Control unit (ECU), to assist companion autonomous vehicle 900 follow the movements of vehicle 902. For example, companion autonomous vehicle 900 can receive turn signal information from vehicle 902 so that companion autonomous vehicle 900 can prepare to change lanes or make a turn. Companion autonomous vehicle 900 can also receive information associated with speed and/or braking from vehicle 902, as well as other information, such as global positioning system (GPS) routing or destination data.

In an example embodiment, companion autonomous vehicle 900 can use one or more sensors to recognize and follow vehicle 902. For example, companion autonomous vehicle 900 can use a camera or other image sensor to read and recognize a license plate associated with vehicle 902 to follow predetermined distance D1 behind vehicle 902. In other embodiments, companion autonomous vehicle 900 can use wireless communication technology, such as WiFi, cellular, Bluetooth, etc., to establish and maintain virtual tether 904 at predetermined distance D1 behind vehicle 902. Using virtual tether 904, companion autonomous vehicle 900 can follow vehicle 902 as vehicle 902 drives to a destination. With this arrangement, companion autonomous vehicle 900 allows the user of vehicle 902 to haul equipment, supplies, materials, or other items or goods that would not otherwise fit inside vehicle 902 to a destination.

In this embodiment, companion autonomous vehicle 900 is configured to follow vehicle 902. In other embodiments, however, companion autonomous vehicle 900 can be configured with virtual tether 904 to follow other objects or users. For example, in one embodiment, companion autonomous vehicle 900 can be connected or linked via a data connection using wireless communication technology, such as WiFi, cellular, Bluetooth, etc., to establish and maintain virtual tether 904 with other objects or users, including, but not limited to: cell phones or tablets, robot companions or other small vehicles (i.e., drones, cycles, scooters, etc.), wearable devices worn by a user, or any other device that can be linked via the data connection to companion autonomous vehicle 900. In still other embodiments, companion autonomous vehicle 900 can be configured to follow a geo-set location, for example, to travel along a route including various waypoints to a destination.

In this embodiment, companion autonomous vehicle 900 follows vehicle 902 at predetermined distance D1 behind vehicle 902. In other embodiments, virtual tether 904 can allow companion autonomous vehicle 900 to stay within a predetermined range of the vehicle, device, or user (e.g., vehicle 902), including, following behind, traveling/scouting ahead, or otherwise maintaining predetermined distance D1 nearby.

Additionally, while the present embodiments are described with reference to a single companion autonomous vehicle (e.g., companion autonomous vehicle 900), in some embodiments, more than one companion autonomous vehicle can be provided with a virtual tether to a vehicle, device, or user. With this arrangement, the capacity for hauling items or objects can be increased and/or companion autonomous vehicles with different functionalities and/or features can be provided.

Figure 10:
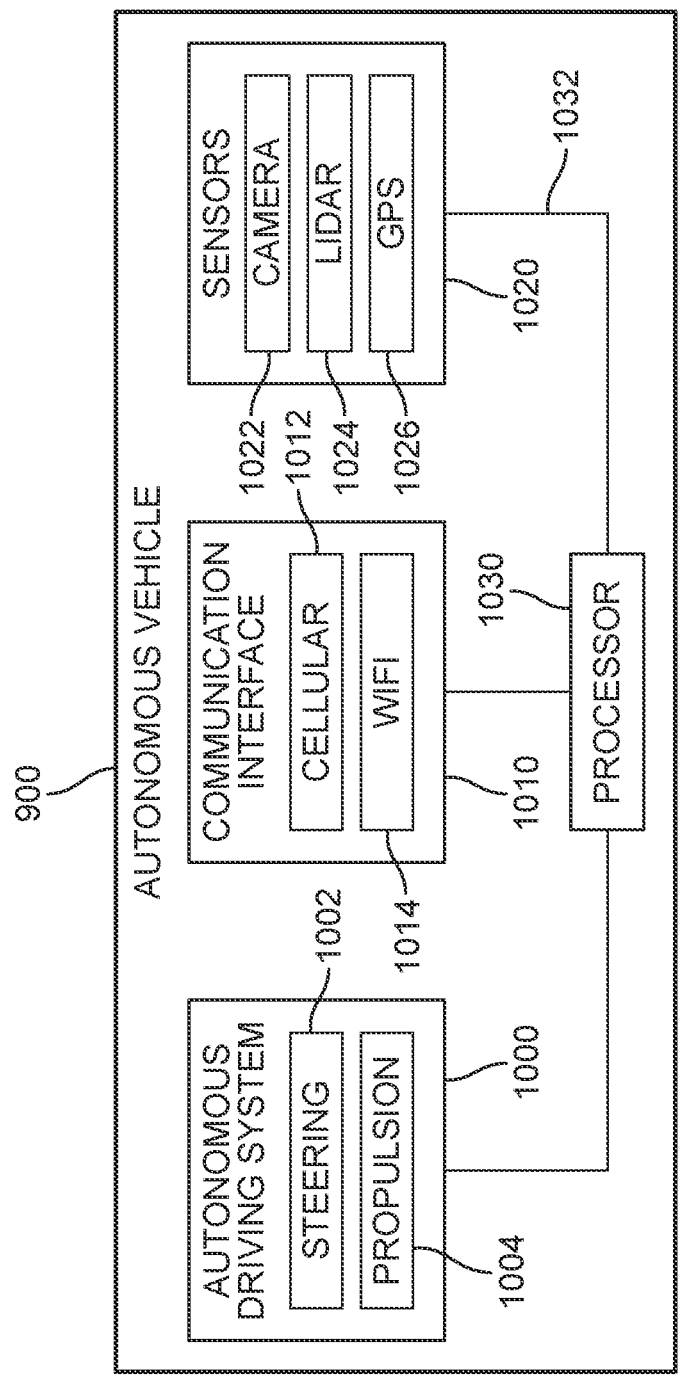
FIG. 10 is a block diagram of an example embodiment of a companion autonomous vehicle.

Referring now to FIG. 10, a block diagram of an example embodiment of components of companion autonomous vehicle 900 is shown. It should be understood that the components of companion autonomous vehicle 900 shown in this embodiment are exemplary, and a companion autonomous vehicle provided according to the techniques described herein can include additional or different components. For example, in some cases, the components included in the companion autonomous vehicle can be based on the feature or function that the companion autonomous vehicle is to provide to a vehicle, device, or user.

In this embodiment, companion autonomous vehicle 900 includes at least an autonomous driving system 1000, a communication interface 1010, a suite of sensors 1020, and a processor 1030 that is configured to communicate with and/or control each of autonomous driving system 1000, communication interface 1010, and suite of sensors 1020 during operation of companion autonomous vehicle 900. For example, processor 1030 can be configured to communicate with and/or control the other systems in companion autonomous vehicle 900 (e.g., autonomous driving system 1000, communication interface 1010, and/or suite of sensors 1020) over a communications bus 1032 employing data communication technology, such as a controller area network (CAN), automotive Ethernet, or other data communication technology.

In an example embodiment, autonomous driving system 1000 includes various subsystems and components configured to allow companion autonomous vehicle 900 to travel autonomously. For example, in this embodiment, autonomous driving system 1000 includes at least a steering system 1002 that is configured to control the direction or orientation of the steerable wheels of companion autonomous vehicle 900. In this embodiment, autonomous driving system 1000 also includes a propulsion system 1004 that is configured to control the movement (i.e., speed and/or braking) of companion autonomous vehicle 900. In one embodiment, propulsion system 1004 can include a motor, such as one or more electric motors, a combustion engine, or a hybrid engine/motor system, to provide a driving force to one or more wheels of companion autonomous vehicle 900, as well as a brake system, such as a conventional or regenerative braking system, to provide a stopping force to one or more wheels of companion autonomous vehicle 900.

In some embodiments, communication interface 1010 can include components for communicating with other vehicles, devices, users, etc. using one or more forms of wireless communication technology. For example, in this embodiment, communication interface 1010 includes at least a cellular module 1012 configured to allow companion autonomous vehicle 900 to receive and/or transmit using various cellular communication technologies, such as 3G, 4G, 5G, etc. wireless networks. Additionally, communication interface 1010 can further include a WiFi module 1014 configured to allow companion autonomous vehicle 900 to receive and/or transmit using short-range wireless communication technologies. In other embodiments, communication interface 1010 can include other forms of wireless communication technology, including components that allow companion autonomous vehicle 900 to communicate using Wireless Wide Area Networks (WWAN), Wireless Local Area Networks (WLAN), and/or other forms of wireless communication technology.

In some embodiments, companion autonomous vehicle 900 can be provided with suite of sensors 1020 that are configured to detect and monitor objects and surroundings near companion autonomous vehicle 900, as well as determine location, orientation, speed, heading, and other information associated with the position and/or movement of companion autonomous vehicle 900. In this embodiment, suite of sensors 1020 includes at least a camera 1022, a LIDAR system 1024, and a GPS sensor 1026. In other embodiments, suite of sensors 1020 can include other sensors used to assist companion autonomous vehicle 900 during operation and travel.

Figure 11:
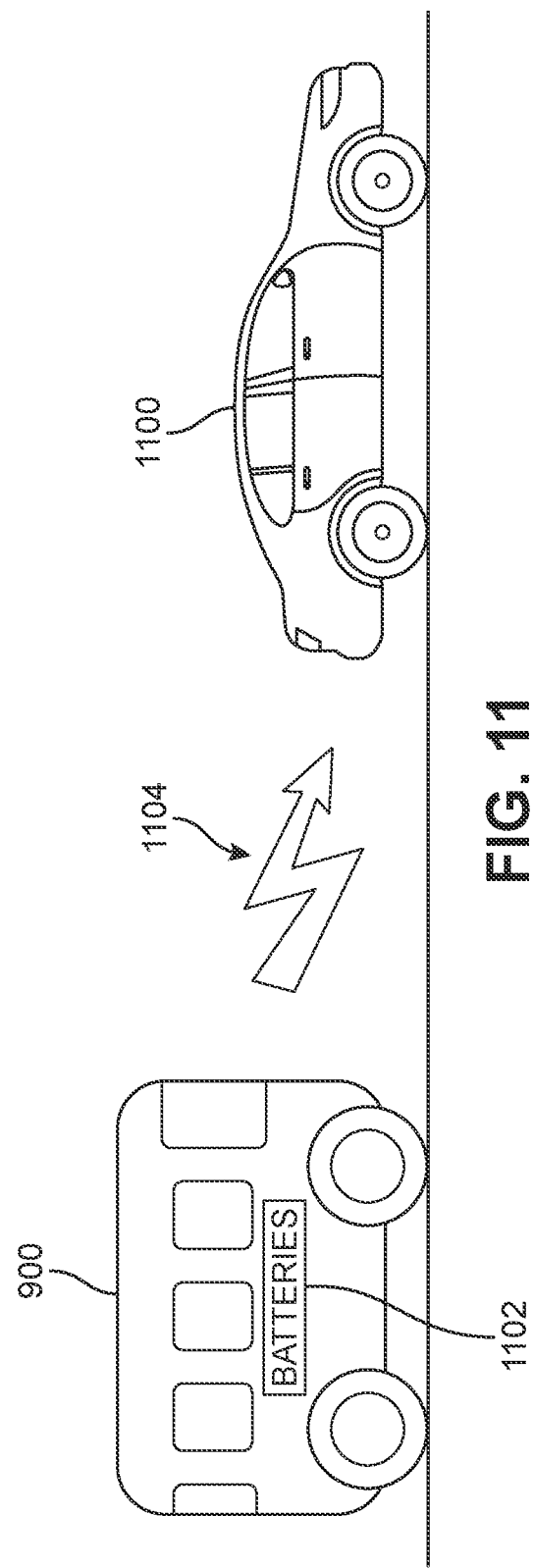
FIG. 11 is a representative view of an example embodiment of a companion autonomous vehicle providing wireless charging to an electric vehicle.

As described above, a companion autonomous vehicle (e.g., companion autonomous vehicle 900) can be provided with various capabilities and/or functionalities to assist another vehicle, device, or user. In some embodiments, the companion autonomous vehicle can be configured to assist with extending a range or travel distance of an electric vehicle. Referring now to FIG. 11, an example embodiment of companion autonomous vehicle 900 providing wireless charging to an electric vehicle 1100 is shown.

In this embodiment, companion autonomous vehicle 900 is configured to follow electric vehicle 1100 via a virtual tether, as described above, to stay within a predetermined distance or range of electric vehicle 1100. In an example embodiment, companion autonomous vehicle 900 is provided with one or more batteries 1102 that store electric charge that can be wirelessly supplied to electric vehicle 1100 to provide charging to batteries on board electric vehicle 1100 and/or to supply electricity to one or more electric motors associated with electric vehicle 1100.

For example, as shown in FIG. 11, batteries 1102 on companion autonomous vehicle 900 provide a wireless charge 1104 that is transmitted to electric vehicle 1100 as companion autonomous vehicle 900 travels along with electric vehicle 1100. Wireless charge 1104 can be provided using a vehicle-to-vehicle wireless charging system, such as the vehicle-to-vehicle wireless charging system described in U.S. Pat. No. 9,630,516, the disclosure of which is incorporated by reference herein in its entirety. In embodiments that include vehicle-to-vehicle wireless charging, each participating vehicle (e.g., companion autonomous vehicle 900 and electric vehicle 1100) includes the components of the vehicle-to-vehicle wireless charging system that allow companion autonomous vehicle 900 to provide wireless charge 1104 and electric vehicle 1100 to receive wireless charge 1104.

With this configuration, the companion autonomous vehicle (e.g., companion autonomous vehicle 900) can be provided to assist with extending the range or capacity of an electric vehicle (e.g., electric vehicle 1100) without requiring the electric vehicle to find or stop at electric charging stations along its travel route. In addition, in some embodiments, multiple companion autonomous vehicles can be provided to supply an electric vehicle with additional electric charge.

Figure 12:
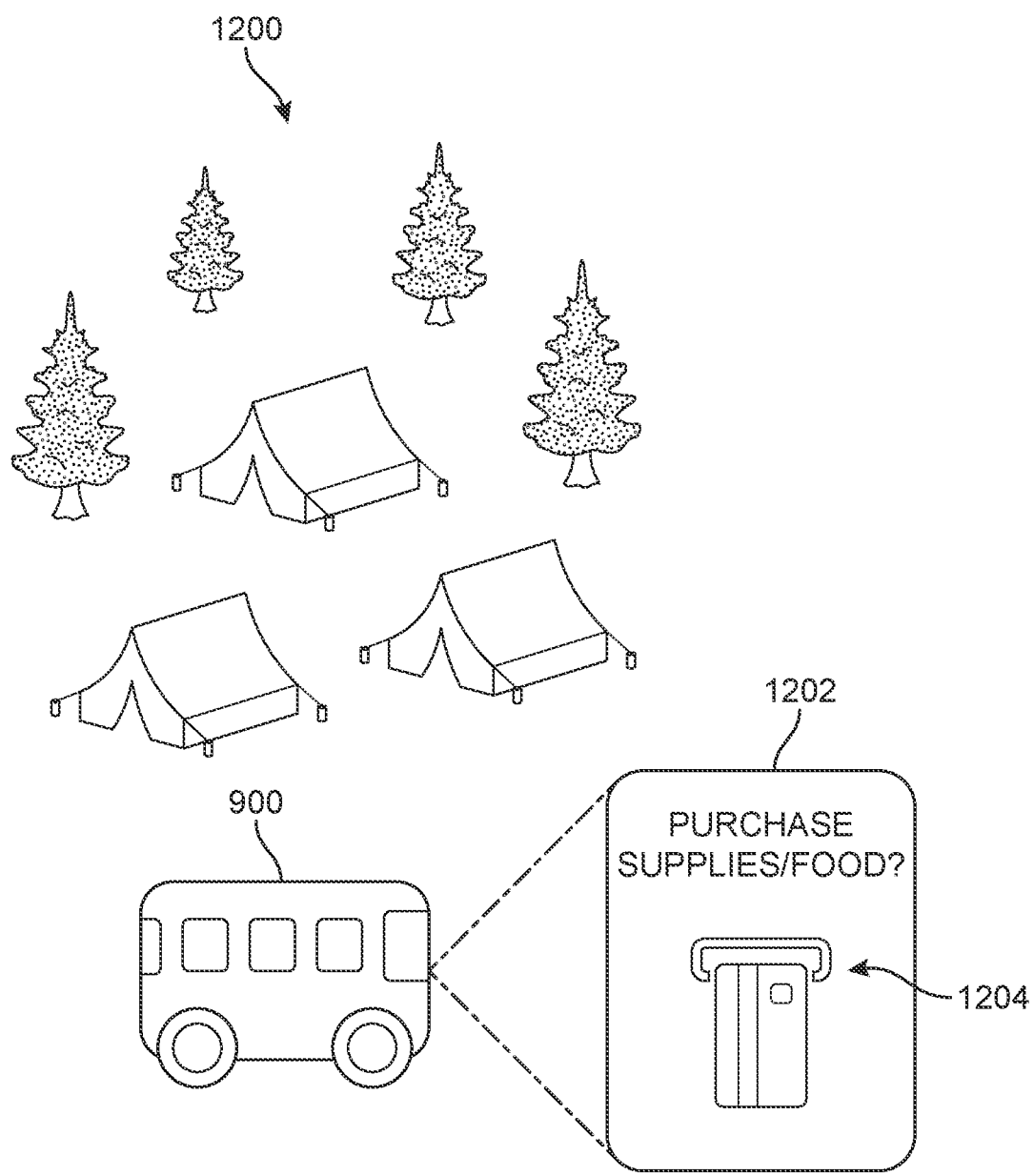
FIG. 12 is a schematic view of an example embodiment of a companion autonomous vehicle with a point-of-sale feature.

In another embodiment, companion autonomous vehicle 900 can be provided with additional items or services that can be used or purchased by a user. For example, as described above with reference to previous embodiments, an autonomous vehicle can be equipped with various equipment for different activities as requested or ordered by a user, such as for camping. In these embodiments, the autonomous vehicle can further include other items or services that are available for purchase by the user. Referring now to FIG. 12, a schematic view of an example embodiment of companion autonomous vehicle 900 with a point-of-sale feature is shown.

As shown in FIG. 12, companion autonomous vehicle 900 is located at a campsite 1200. In this embodiment, companion autonomous vehicle 900 can include equipment for a selected activity at campsite 1200, such as camping (e.g., tent 304, axe 306, and sleeping bag 308 shown in FIG. 5) in accordance with the previous embodiments, described above. In some cases, a user can realize or determine that additional equipment or supplies can be useful or necessary at campsite 1200. According to the present embodiment, companion autonomous vehicle 900 is provided with a point-of-sale interface 1202 that allows a user to purchase or rent additional equipment or supplies that have not been included with the equipment in the equipped companion autonomous vehicle 900.

In an example embodiment, companion autonomous vehicle 900 can include a secure storage area or other partition within the interior of companion autonomous vehicle 900 that can be accessed by a user upon making a purchase through point-of-sale interface 1202. For example, a user can use point-of-sale interface 1202 of companion autonomous vehicle 900 to purchase water, food, firewood, fuel, etc. while at campsite 1200. The user can provide a credit card or other form of payment to a payment terminal 1204 associated with point-of-sale interface 1202 of companion autonomous vehicle 900 to purchase the additional supplies or services. Upon acceptance of payment via payment terminal 1204, companion autonomous vehicle 900 can unlock or open the secure storage area within companion autonomous vehicle 900 so that the user can retrieve the purchased supplies.

In other embodiments, companion autonomous vehicle 900 can include a preset package or group of supplies based on the selected activity for the autonomous vehicle and any supplies that are used or removed from companion autonomous vehicle 900 are charged to the user's account or billed after the user's trip has been completed. With this arrangement, a user can conveniently acquire additional supplies or services while at a location without requiring further travel to other destinations.

Figure 13:
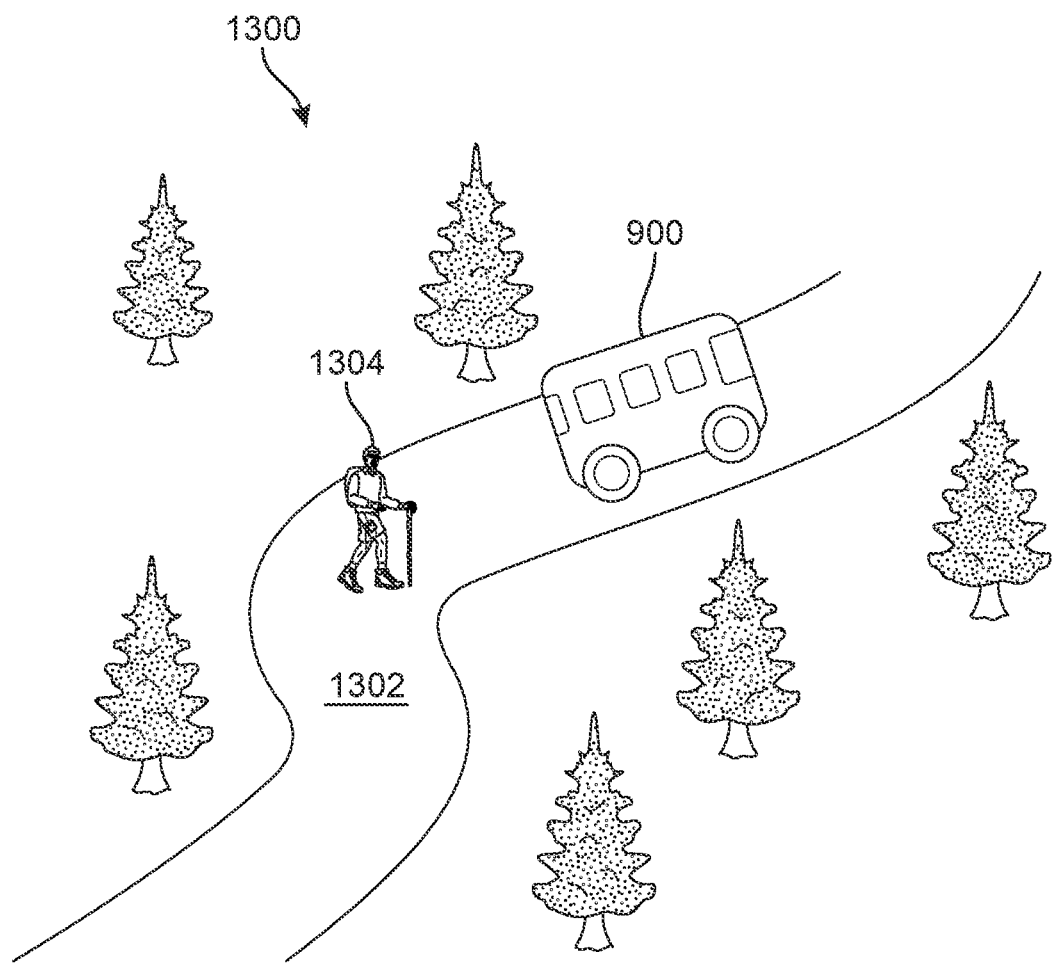
FIG. 13 is a representative view of an example embodiment of a companion autonomous vehicle tethered to a user.

As described above, in some embodiments, a companion autonomous vehicle (e.g., companion autonomous vehicle 900) can be configured to travel ahead of another vehicle, device, or user. That is, the virtual tether between the companion autonomous vehicle and the vehicle, device, or user can include traveling in front of or scouting ahead by a predetermined distance. Referring now to FIG. 13, example embodiment of companion autonomous vehicle 900 tethered to a user 1304 is shown.

In an example embodiment, companion autonomous vehicle 900 can be located in an off-road environment 1300 that includes a trail 1302. In this embodiment, user 1304 is a hiker that is virtually tethered to companion autonomous vehicle 900 in a scout mode such that companion autonomous vehicle 900 travels ahead of or in front of user 1304 by a predetermined distance. For example, user 1304 can be tethered to companion autonomous vehicle 900 by a mobile device held by user 1304 or a wearable device worn on user 1304 that is in communication with companion autonomous vehicle 900.

In this embodiment, companion autonomous vehicle 900 is configured to travel on trail 1302 in front of user 1304 through off-road environment 1300. With this arrangement, companion autonomous vehicle 900 can use on-board sensors (e.g., one or more sensors of suite of sensors 1020) to detect hazards and/or conditions on trail 1302 to assist user 1304 with navigating on trail 1302 through off-road environment 1300. Additionally, in other embodiments, companion autonomous vehicle 900 can be used in scout mode to travel ahead of another vehicle, device, or user in other types of environments.

Figure 14:
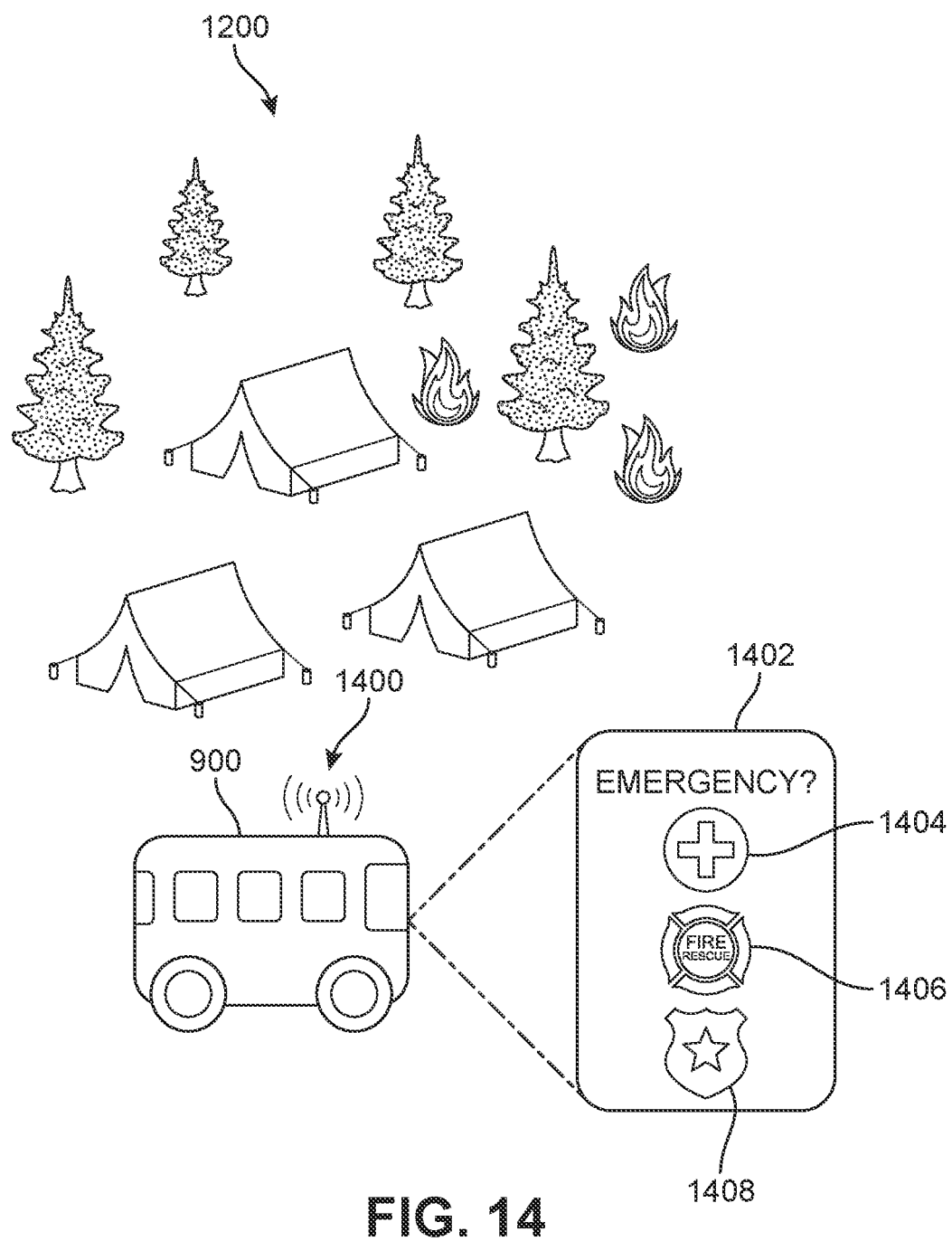
FIG. 14 a schematic view of an example embodiment of a companion autonomous vehicle at a campsite.

In another embodiment, a companion autonomous vehicle (e.g., companion autonomous vehicle 900) can be provided with services, such as cellular communication capabilities, that can be used by a user at a location. Referring now to FIG. 14, a schematic view of an example embodiment of companion autonomous vehicle 900 at campsite 1200 is shown. In this embodiment, companion autonomous vehicle 900 includes a cellular communication component 1400. For example, as described above, cellular communication component 1400 can be part of communication interface 1010.

In some embodiments, cellular communication component 1400 of companion autonomous vehicle 900 can be configured to provide a user with communication capabilities at a remote location, such as campsite 1200. For example, in some areas, the cellular capabilities of handheld devices, such as mobile phones, are not sufficiently powerful to transmit or receive. In these situations, cellular communication component 1400 of companion autonomous vehicle 900 can be better equipped to provide communication capabilities to a user at campsite 1200.

In this embodiment, cellular communication component 1400 of companion autonomous vehicle 900 can include an emergency services interface 1402 that allows a user at campsite 1200 to request or contact emergency personnel, such as medical services 1404, fire and rescue services 1406, and/or police or law enforcement services 1408. Using cellular communication component 1400 of companion autonomous vehicle 900, a user can be connected to one or more emergency services that can be needed at the location, such as campsite 1200. For example, as shown in FIG. 14, a user can use emergency services interface 1402 of companion autonomous vehicle 900 to contact fire and rescue services 1406 to report a forest fire at campsite 1200. With this configuration, companion autonomous vehicle 900 can provide a way for users to receive assistance in an area where mobile devices do not have sufficient cellular capabilities.

Additionally, in other embodiments, cellular communication component 1400 of companion autonomous vehicle 900 can be configured for other uses beyond contacting emergency services. For example, in some embodiments, cellular communication component 1400 of companion autonomous vehicle 900 can act as a cellular data connection for one or more devices associated with a user at the location (e.g., campsite 1200). In this manner, cellular communication component 1400 of companion autonomous vehicle 900 can provide users with cellular network connections in an area where mobile devices do not have sufficient cellular capabilities on their own.

While various embodiments have been described, the description is intended to be exemplary, rather than limiting and it will be apparent to those of ordinary skill in the art that many more embodiments and implementations are possible that are within the scope of the claims. Additionally, one or more of the various embodiments described above can be combined in part or in whole in accordance with the principles described herein. Accordingly, the embodiments are not to be restricted except in light of the attached claims and their equivalents. Also, various modifications and changes can be made within the scope of the attached claims.

The invention claimed is:

1. A method for providing services by a companion autonomous vehicle at a location, the method comprising:
   providing at least one companion autonomous vehicle to travel to a location using a propulsion system to provide a driving force and a stopping force to one or more wheels of the companion autonomous vehicle;
   including at least one first set of equipment for a selected activity at the location on the at least one companion autonomous vehicle;
   including at least one second set of equipment for another activity that is different from the selected activity within a secure storage area of the at least one companion autonomous vehicle, wherein the at least one second set of equipment is separated from the at least one first set of equipment within the at least one companion autonomous vehicle;
   equipping the at least one companion autonomous vehicle with a cellular communication component to allow the at least one companion autonomous vehicle to communicate using a cellular communication network;
   providing at least a point-of-sale interface on the at least one companion autonomous vehicle that uses the cellular communication component to communicate over the cellular communication network, wherein the point-of-sale interface is configured to provide access to the secure store area within the at least one companion autonomous vehicle; and
   upon acceptance of payment from a user through a payment terminal of the point-of-sale interface, unlocking or opening the secure storage area of the at least one companion autonomous vehicle so that the user may retrieve the at least one second set of equipment.

2. The method of claim 1, further comprising:
   providing an emergency services interface on the at least one companion autonomous vehicle that uses the cellular communication component to communicate over the cellular communication network; and
   wherein the emergency services interface is configured to contact at least one of medical services, fire and rescue services, or police or law enforcement services.

3. The method of claim 1, wherein the point-of-sale interface is further configured to allow a purchase of supplies stored on board the companion autonomous vehicle.

4. The method of claim 1, wherein the cellular communication component is further configured to provide a data connection for one or more devices to the cellular communication network.

5. The method of claim 1, wherein the at least one second set of equipment is provided onboard the companion autonomous vehicle for rental at the location.

6. The method of claim 1, further comprising:
   instructing the companion autonomous vehicle to travel from a service center to the location;
   wherein the at least one first set of equipment for the selected activity is equipped onboard the companion autonomous vehicle at the service center.

7. The method of claim 1, wherein the companion autonomous vehicle further includes additional supplies onboard the companion autonomous vehicle separate from the at least one first set of equipment that are available for purchase using the point-of-sale interface.

8. The method of claim 7, wherein the additional supplies are stored in the secure storage area or other partition within an interior of the companion autonomous vehicle.

9. The method of claim 1, further comprising:
   upon receiving a notification from a user that the user has finished using the companion autonomous vehicle, instructing the companion autonomous vehicle to travel to a service center from the location; and
   wherein the service center is configured to remove and clean the at least one first set of equipment from the companion autonomous vehicle.

10. The method of claim 8, wherein a user of the companion autonomous vehicle is charged for any of the additional supplies upon return of the companion autonomous vehicle to a service center from the location.

11. A companion autonomous vehicle comprising:
    an autonomous driving system including steering and propulsion capabilities;
    a communication interface including a cellular communication component to allow the at least one companion autonomous vehicle to communicate using a cellular communication network;
    a point-of-sale interface on the companion autonomous vehicle that uses the cellular communication component to communicate over the cellular communication network;
    at least one first set of equipment for a selected activity to be used at the location;
    a secure storage area onboard the companion autonomous vehicle, the secure storage area including at least one second set of equipment for another activity that is different from the selected activity, wherein the at least one second set of equipment is separated from the at least one first set of equipment within the companion autonomous vehicle;
    wherein the point-of-sale interface is configured to provide access to the secure store area;
    a suite of sensors including one or more of a camera, a LIDAR sensor, or a global positioning system (GPS) sensor; and
    a processor in communication with at least the autonomous driving system, the communication interface, the point-of-sale interface, and the suite of sensors;

wherein the processor is configured to:
   receive instructions to travel to a location;
   operate the companion autonomous vehicle using the autonomous driving system and the suite of sensors to travel along a route to the location;
   provide services to a user at the location through the point-of-sale interface; and
   upon acceptance of payment from a user through a payment terminal of the point-of-sale interface, unlock or open the secure storage area so that the user may retrieve the at least one second set of equipment.

12. The companion autonomous vehicle of claim 11, further comprising:
   an emergency services interface that uses the cellular communication component to communicate over the cellular communication network; and
   wherein the emergency services interface is configured to contact at least one of medical services, fire and rescue services, or police or law enforcement services.

13. The companion autonomous vehicle of claim 11, wherein the point-of-sale interface is further configured to allow a purchase of supplies stored on board the companion autonomous vehicle.

14. The companion autonomous vehicle of claim 11, wherein the cellular communication component is further configured to provide a data connection for one or more devices to the cellular communication network.

15. The companion autonomous vehicle of claim 11, wherein the at least one second set of equipment is provided for rental at the location.

16. The companion autonomous vehicle of claim 11, wherein the companion autonomous vehicle is configured to travel from a service center to the location; and
   wherein the at least one first set of equipment for the selected activity is equipped onboard the companion autonomous vehicle at the service center.

17. The companion autonomous vehicle of claim 11, further comprising:
   additional supplies onboard the companion autonomous vehicle separate from the at least one first set of equipment that are available for purchase using the point-of-sale interface.

18. The companion autonomous vehicle of claim 17, wherein the additional supplies are stored in the secure storage area or other partition within an interior of the companion autonomous vehicle.

19. The companion autonomous vehicle of claim 18, wherein the processor is further configured to:
   upon receiving a notification from a user that the user has finished using the companion autonomous vehicle, instruct the companion autonomous vehicle to travel to a service center from the location; and
   wherein the service center is configured to remove and clean the at least one first set of equipment from the companion autonomous vehicle.

20. The companion autonomous vehicle of claim 18, wherein a user of the companion autonomous vehicle is charged for any of the additional supplies upon return of the companion autonomous vehicle to a service center from the location.

\* \* \* \* \*